United States Patent
Forrest (10) Patent No.: US 11,265,360 B2
(45) Date of Patent: Mar. 1, 2022

(54) SYSTEM FOR MANAGING JOINTLY ACCESSIBLE DATA

(71) Applicant: Barclays Execution Services Limited, London (GB)

(72) Inventor: Michael Forrest, Knutsford (GB)

(73) Assignee: Barclays Execution Services Limited, London (GB)

( * ) Notice: Subject to any disclaimer, the term of this patent is extended or adjusted under 35 U.S.C. 154(b) by 162 days.

(21) Appl. No.: 16/269,067

(22) Filed: Feb. 6, 2019

(65) Prior Publication Data

US 2019/0245909 A1 Aug. 8, 2019

(30) Foreign Application Priority Data

Feb. 6, 2018 (EP) .................................... 18155395

(51) Int. Cl.
- *H04L 29/08* (2006.01)
- *H04L 29/06* (2006.01)

(Continued)

(52) U.S. Cl.
CPC ............. *H04L 67/02* (2013.01); *G06F 16/95* (2019.01); *G06F 21/6245* (2013.01); *H04L 9/321* (2013.01); *H04L 9/3231* (2013.01); *H04L 63/0807* (2013.01); *H04L 63/0853* (2013.01); *H04L 63/18* (2013.01); *H04L 67/40* (2013.01); *G06F 2221/2137* (2013.01); *G06F 2221/2141* (2013.01); *G06Q 10/10* (2013.01)

(58) Field of Classification Search
CPC .................................................. H04L 63/0428
See application file for complete search history.

(56) References Cited

U.S. PATENT DOCUMENTS

| | | | |
|---|---|---|---|
| 6,775,668 B1* | 8/2004 | Goel | G06F 21/40 |
| 7,992,183 B1* | 8/2011 | Harrenstien | G06Q 10/00 725/137 |

(Continued)

OTHER PUBLICATIONS

International Search Report and Written Opinion dated Feb. 28, 2019 in connection with International Application No. PCT/EP2019/052915.

(Continued)

*Primary Examiner* — Ario Etienne
*Assistant Examiner* — Sm Z Islam
(74) *Attorney, Agent, or Firm* — Wilmer Cutler Pickering Hale and Dorr LLP (57) ABSTRACT

A computer-implemented method for managing a secure data item that is jointly accessible by the first user and the second user. In the method a first system receives a data request comprising an instruction to transmit the secure data item to a second system. The first system identifies that the secure data item is jointly accessible by the first user and the second user, and in response transmits an authorisation request to the second user device. The authorisation request comprises a prompt for the second user to authorise the data request. The first system receives a grant message indicative of the second user granting the authorisation request and in response transmits the secure data item to the second system. The secure data item is prevented from being sent to the second system, if the grant message is not received.

15 Claims, 6 Drawing Sheets

(51) Int. Cl.
  *G06F 21/62*    (2013.01)
  *G06F 16/95*    (2019.01)
  *H04L 9/32*     (2006.01)
  *G06Q 10/10*    (2012.01)
  *H04L 67/02*    (2022.01)
  *H04L 67/133*   (2022.01)

(56) References Cited

U.S. PATENT DOCUMENTS

| | | | |
|---|---|---|---|
| 8,955,149 B1* | 2/2015 | Baer | G06F 21/6218 |
| | | | 709/229 |
| 2009/0172101 A1* | 7/2009 | Arthursson | G06F 9/452 |
| | | | 709/205 |
| 2012/0017250 A1* | 1/2012 | Tirasirikul | H04N 21/44222 |
| | | | 725/85 |
| 2012/0117157 A1 | 5/2012 | Ristock | |
| 2016/0156623 A1* | 6/2016 | Liang | H04L 67/02 |
| | | | 713/168 |
| 2016/0239547 A1* | 8/2016 | Lim | G06Q 30/0205 |
| 2017/0235490 A1* | 8/2017 | Tan | G06F 21/6218 |
| | | | 711/152 |
| 2019/0227857 A1* | 7/2019 | Koszek | G06F 21/6281 |

OTHER PUBLICATIONS

Extended European Search Report dated Jul. 4, 2018 in connection with European Application No. EP 18155395.9.

* cited by examiner

SYSTEM FOR MANAGING JOINTLY ACCESSIBLE DATA

RELATED APPLICATIONS

Foreign priority benefits are claimed under 35 U.S.C. § 119 to European application number 18155395.9, filed Feb. 6, 2018, the entire contents of which is hereby incorporated herein by reference in its entirety.

TECHNICAL FIELD

This disclosure relates to a system, a method and a computer program for managing data associated with a first user and a second user.

BACKGROUND

In conventional digital communication systems it is common for an individual user to have access to an online account, which provides the user with the ability to store and access data via the Internet. For example, one user may operate an online user account hosted by a file hosting service to store electronic files such as image files, music files and word processing documents. These files may be used to store sensitive personal information about the user, which the user must keep private in order to avoid the likelihood of becoming a victim of fraud or identity theft. In a specific example of an online user account, the user may use an online banking account to access their financial data, such as records of previous financial transactions that the user has made.

In certain situations it is desirable for two or more users to have permission to access the same online account, so that data is jointly accessible by the two users via an interface for the shared online account. In this scenario it is assumed that the two users trust one another with the data that is accessible via the online account.

Following on from the example of the file hosting service, two users may use a single online account operated by the file hosting service to store private data or documents that relate to both of the users, such as housing information, personal identity information and financial information. In a specific example, two users may have access to a single online banking account for storing sensitive financial data. In each of these examples, each user is provided with login information that is specific to each user, so that the shared online account can determine which user is accessing the account at a particular time.

Users of shared accounts rely on the assumption that each of the users will not abuse their access to the data in such a way that would comprise any one of the other user's information security. However, this assumption may not be correct. For instance, one user may transmit private data of the shared online account to a third party, and another user of the online account may not wish for any third parties to have access to this private data. Thus, there exists a need for a system that enables users of joint online accounts to manage access to data in a secure manner.

SUMMARY

In one aspect of the invention, there is a computer-implemented method for managing data associated with a first user having a first user device and a second user having a second user device, the method comprising: storing, at a first system, a secure data item jointly accessible by the first user and the second user; receiving, at the first system from the first user device, a data request comprising an instruction to transmit the secure data item to a second system; identifying, at the first system, that the secure data item is jointly accessible by the first user and the second user; in response to identifying that the secure data item is jointly accessible by the first user and the second user, transmitting an authorisation request to the second user device, wherein the authorisation request comprises a prompt for the second user to authorise the data request; receiving, from the second user device, a grant message indicative of the second user granting the authorisation request; in response to receiving the grant message, transmitting the secure data item to the second system; and preventing the secure data item from being sent to the second system, if the grant message is not received.

In this way, the second system is unable to receive the jointly accessible data item unless both of the users that have access to the data have provided authorisation for the data to be shared. This prevents a single user from unilaterally allowing the secure data item to be sent to the second system, which would compromise the security of the second user. Thus, the method provides a mechanism for jointly accessible data items to be shared in a more secure manner.

In another aspect of the invention, there is data management system comprising: a data storage resource configured to store a secure data item jointly accessible by both a first user and a second user; and processing circuitry configured to: receive, from a first user device associated with the first user, a data request comprising an instruction to transmit the secure data item from the data storage resource to a remote system; identify that the secure data item is jointly accessible by the first user and the second user; transmit an authorisation request to a second user device associated with the second user, in response to identifying that the secure data item is jointly accessible by the first user and the second user, the authorisation request comprising a prompt for the second user to authorise the data request; receive, from the second user device, a grant message indicative of the second user granting the authorisation request; transmit the secure data item to the remote system in response to receiving the grant message; and prevent the secure data item from being sent to the remote system, if the grant message is not received.

In another aspect of the invention, there is a data management system comprising: a data storage resource configured to store a secure data item jointly accessible by both a first user and a second user; a receiver configured to receive, from a first user device associated with the first user, a data request comprising an instruction to transmit the secure data item from the data storage resource to a remote system; an identification module arranged to identify that the secure data item is jointly accessible by the first user and the second user; a transmitter arranged to transmit an authorisation request to a second user device associated with the second user, in response to identifying that the secure data item is jointly accessible by the first user and the second user, the authorisation request comprising a prompt for the second user to authorise the data request; wherein the receiver is arranged to receive, from the second user device, a grant message indicative of the second user granting the authorisation request; wherein the transmitter is arranged to transmit the secure data item to the remote system in response to receiving the grant message; and wherein the transmitter is arranged to prevent the secure data item from being sent to the remote system, if the grant message is not received.

In another aspect of the invention, there is a computer-implemented method for managing data associated with a first user having a first user device, the method comprising: storing, at a first system, a first data item accessible by the first user; receiving at the first system, from the first user device, a data retention request comprising an instruction not to transmit the first data item stored at the first system to a system distinct from the first system; in response to receiving the data retention request, setting a data retention flag at the first system in association with the first user; receiving a data request from a system distinct from the first system for access to the first data item; in response to the data request, identifying that the first user is associated with the data retention flag at the first system and preventing transmission of the first data item to the second system.

In this way, it is possible for a user to set an indication for their data not to be shared to any third parties. This indication overrides any other indication of the user wishing for their data to be shared. Thus, it is possible for the user to prevent their secure data from being accidentally shared with third parties. This is particularly relevant in modern computing environments where users are presented with a large number of different requests, and in these situations a user may authorise their data to be shared when in fact the user does not wish for this to happen. In this scenario, the data retention flag allows a user to ensure that their data is not transmitted to any fraudulent or malicious third parties that may compromise their information security.

In another aspect of the invention, there is a data management system for managing data associated with a first user having a first user device comprising: a data storage resource configured to store a first data item accessible by the first user; and processing circuitry configured to: receive at the data management system, from the first user device, a data retention request comprising an instruction not to transmit the first data item to a system distinct from the data management system; in response to receiving the data retention request, setting a data retention flag at the data management system in association with the first user; receiving a data request from a system distinct from the data management system for access to the first data item; in response to the data request, identifying that the first user is associated with the data retention flag at the data management system and preventing transmission of the first data item to the system distinct from the data management system.

In another aspect of the invention, there is a data management system for managing data associated with a first user having a first user device comprising: a data storage resource configured to store a first data item accessible by the first user; a receiver arranged to receive, from the first user device, a data retention request comprising an instruction not to transmit the first data item to a system distinct from the data management system; a flag setting module arranged to set a data retention flag at the data management system in association with the first user, in response to receiving the data retention request; wherein the receiver is arranged to receive a data request from a system distinct from the data management system for access to the first data item; and an identification module arranged to identify that the first user is associated with the data retention flag and preventing transmission of the first data item to the system distinct from the data management system in response to the data request.

In another aspect of the invention, there is a computer program comprising instructions which, when the program is executed by a computer, cause the computer to carry out the method described herein.

In another aspect of the invention, there is a data carrier signal carrying the computer program described herein.

In another aspect of the invention, there is a computer readable medium which, when the program is executed by a computer, cause the computer to carry out the method described herein.

BRIEF DESCRIPTION OF THE DRAWINGS

Embodiments of the invention will be described, by way of example, with reference to the following drawings, in which.

DETAILED DESCRIPTION

Figure 1:
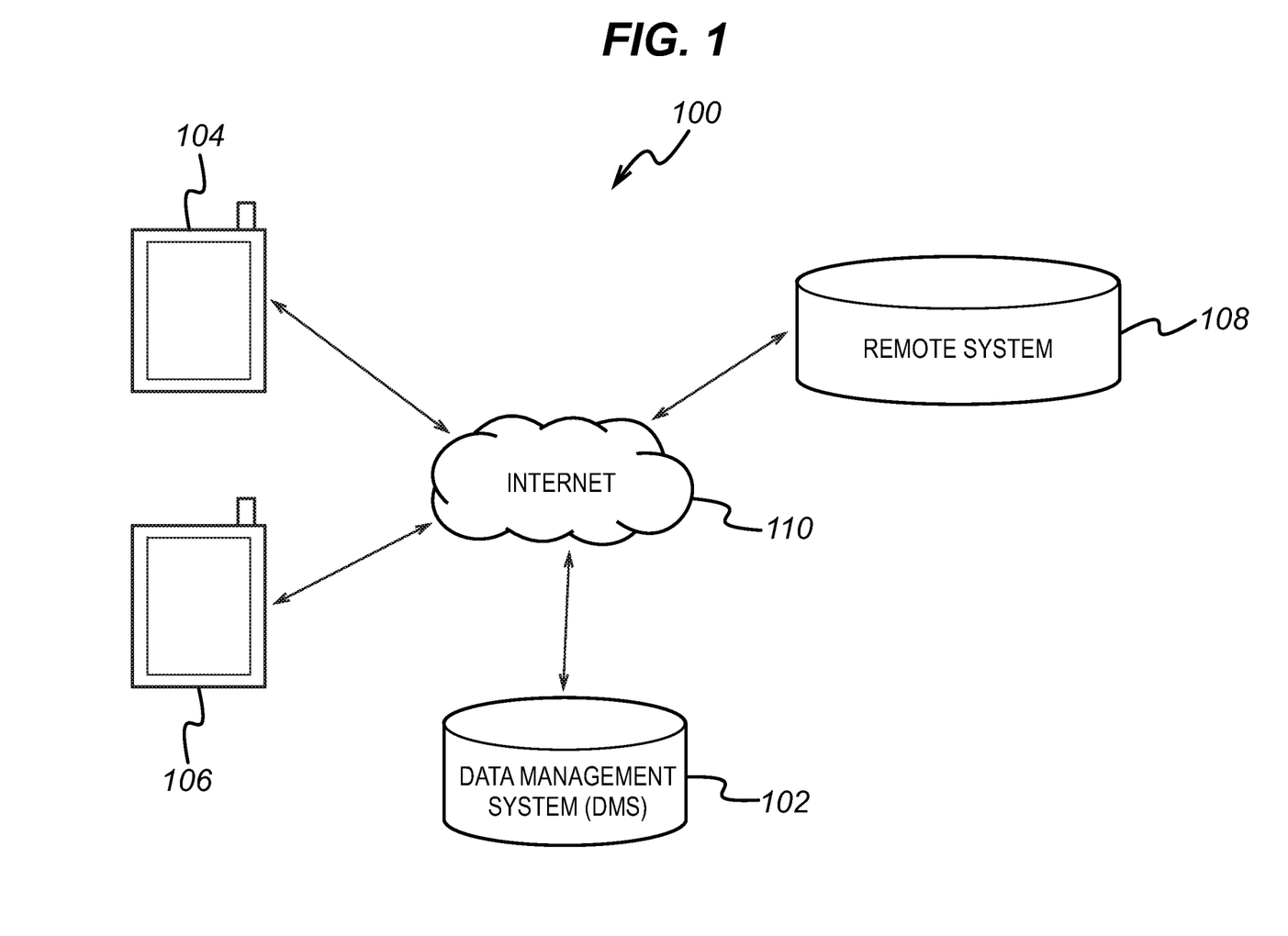
FIG. 1 illustrates the general architecture of a system for managing secure data that is jointly accessible by a first user and a second user.

Referring to FIG. 1, there is a system 100 for managing access to data associated with a first user and a second user. The system comprises a data management system (DMS) 102, a first user device 104, a second user device 106 and a remote system 108.

The DMS 102 is arranged to store data relating to users of the system 100. Specifically, the DMS 102 stores data that is associated with the first user and the second user which may comprise one or more data items. Each one of these data items is indicative of private information relating to the first and second users. For instance, each data item may comprise financial data relating to the first and second users, such as details that enable the users to make payments or the details of previous financial transactions made by the users.

The following systems and methods are described in the context of managing access to financial data. However, these systems and methods could be used to manage access to any type of secure data for which access by unauthorised third parties is to be restricted.

In the following examples, data is referred to as being jointly accessible by the first and second users, and that data is associated with both the first user and the second user. For example, the first user and the second user may have access to the same online user account, such as an online banking account, via an account interface. In this scenario, each one of the users may be assigned a unique username and a shared secret, such as a password, that can be used to access the user account via the account interface. Once the first or the second user has accessed the user account, that user is able to access the data via the user account. Therefore, the data is jointly accessible by the first and second users via login information that is unique to each one of the users. In some situations the users may access the data at the same time, or each user may access the data at different times.

Data that is jointly accessible by a plurality of users is detected by the DMS 102 determining that more than user is associated with an account linked with the data.

The secure data that is jointly accessible by the first and second users may be accessible by the DMS 102 itself. The jointly accessible data may be accessible by the first and second users only, unless otherwise authorised by both the first user and the second user. In other words, the jointly accessible data is prevented from being sent to a device or a system that is remote and distinct from the DMS 102, such as the remote system 108, without the first and second users providing authorisation to the DMS 102 for the jointly accessible data to be sent to a remote device or system.

The system 100 comprises a first user device 104 which is operated by the first user and a second user device 106 which is operated by the second user. The system also comprises a remote system 108 to which the jointly accessible data can be sent.

Each one of the DMS 102, remote system 108 and user devices 104, 106 are arranged to communicate with one another via a communications network 110. The communications network 110, in this example, is the Internet 110. However, it will be appreciated that any suitable form of communications network 110 could be used.

Each one of the DMS 102, remote system 108 and user devices 104, 106 are web-enabled and may comprise a display, a user interface, a processor and memory. The devices and systems 102, 104, 106, 108 can be arranged to communicate data between one another via any suitable communications protocol or connection. For instance, the devices and systems 102, 104, 106, 108 may communicate with one another via a wired and/or a wireless connection.

The first user device 104 and/or the second user device 106 may be any suitable type of personal computing device, such as a laptop computer, a desktop computer, a web-enabled telephone, such as a smartphone, or a tablet device. The DMS 102 and the remote system 108 may be any suitable type of computing system or collection of computing system, such as a server or a collection of servers.

Figure 2:
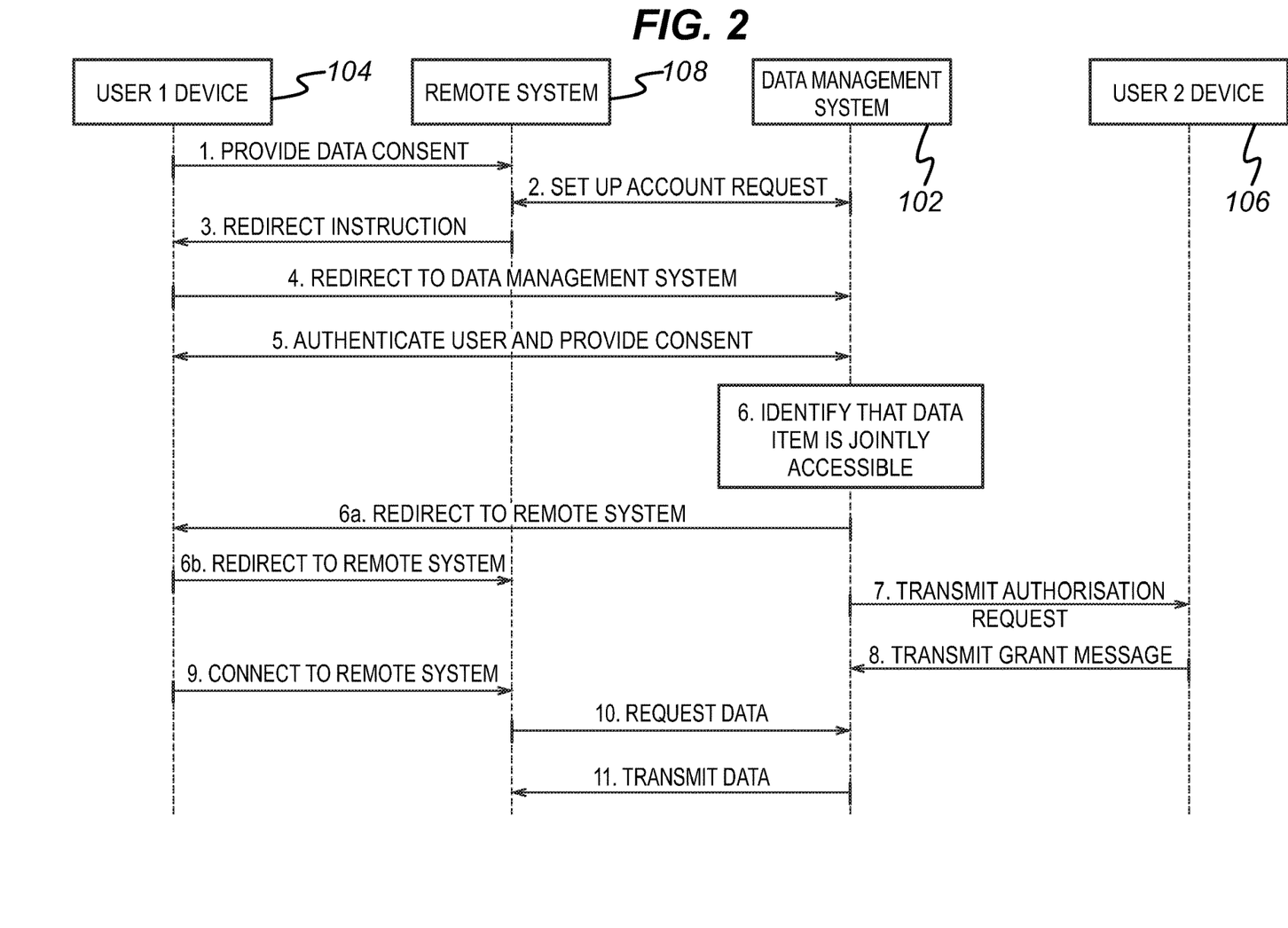
FIG. 2 illustrates a protocol sequence diagram of a computer-implemented method for managing access to the secure data.

Referring to FIG. 2, there is a method for the first and second users to enable the remote system 108 to access the jointly accessible data stored at the DMS 102 using the first user device 104 and the second user device 106.

In step 1, the first user sends a message via the first user device 104 that is indicative of the first user providing their consent for the remote system 108 to access the jointly accessible data stored at the DMS 102. The message that provides the first user's consent for access to the jointly accessible data is sent from the first user device 104 to the remote system 108.

In step 2, the remote system 108 connects to the DMS 102. In this step, the remote system 108 creates an account request resource. This informs the DMS 102 that one of its users is granting the remote system 108 with access to data associated with the online account of that user. In this step, the DMS 102 responds with an identifier for the resource. This step is carried out by the remote system 108 making a POST request, which is supported by the Hypertext Transfer Protocol, to an endpoint at the DMS 102.

In step 2, an account request setup payload is sent from the remote system 108 to the DMS 102, which comprises fields describing the data that the first user has consented for the remote system 108 to access. The fields in the setup payload may comprise a permissions field, an expiration date field and a period field. The permissions field comprises an identifier for a data cluster or a list of identifiers for data clusters that the first user has consented for the remote system 108 to access. The expiration date field comprises an optional expiration time at which point the remote system 108 will be prevented from accessing the first user's data stored at the DMS 102. The period field comprises a date/time range which can be used to only provide access to data items stored at the DMS 102 that are associated with dates/times that fall within the date/time range. For example, the period field may specify a transaction history period. The DMS 102 uses the transaction history period to determine that the remote system 108 is only to have access to the transactions that were made within the transaction history period. The remote system 108 may send multiple account requests for the same user, with different setup payloads in each request.

In step 3, once the account request has been completed, the remote system transmits a redirect message to the first user device 104 that instructs the device 104 to be redirected to the DMS 102. The redirect message includes an account request identifier associated with the account request established in step 2. The account request identifier allows the DMS 102 to correlate messages transmitted from the first user device 104 with the account request that was setup in step 2.

In step 4, the first user device 104 is redirected to the DMS 102. For instance, the first user, is redirected to a web-page or an application through which the first user is able to access their online account. When the first user device 104 is redirected to the DMS 102, the first user device 104 provides the account request identifier to the DMS 102. This allows the DMS 102 to correlate messages from the first user device 104 with the account request of step 2.

In step 5, the DMS 102 authenticates the first user via the first user device 104. This can occur by the first user inputting their login information into the web-page or the application using the first user device 104. Once the user has been authenticated the user is able to provide their consent for the remote system 108 to access their data. Then, the DMS 102 updates the state of the account request resource to indicate that the account request has been authorised by the first user. This may involve setting a flag associated with the first user to indicate that the data is authorised to be shared with the remote system 108, where previously the flag was set to indicate that the data is not authorised to be shared with the remote system 108.

The online user account may comprise a plurality of sub-accounts. For instance, the user's online banking account may comprise different sub-accounts, such as a current account and a savings account. During authorisation, the first user selects accounts that are authorised for the remote system 108 to access. This selection may be executed by the first user via a user interface at the first user device 104.

In the method, the consent for data to be shared is managed in step 1 between the first user and the remote system 108. Thus, the first user cannot change the details of the account request by interacting with the DMS 102 in step 5. The first user will only be able to authorise or reject the account request details in its entirety in step 5. In order for the first user to change the details of the account request, it is necessary for step 1 to be repeated with different consent parameters provided by the first user.

In step 6, the DMS 102 identifies the secure data item or items which the first user has provided consent for the remote system 108 to access. In this example, the DMS 102 identifies that the secure data item or items are jointly accessible by the first user and a second user. As explained above, the jointly accessible data items may be data items that are accessible by the first and second users only, unless otherwise authorised by both the first user and the second user. In steps 6a and 6b, the first user device 104 is redirected back to the remote system 108. However, at this point the remote system 108 is unable to access the data items for which consent was provided by the first user until consent has been provided by the second user. Thus, if the remote system 108 were to transmit a request for the data to the DMS 102 at this point, then the request would be rejected by the DMS 102.

In step 7, if the DMS 102 determines that the data item to which the remote system 108 has been granted access is jointly accessible by the first user and the second user, then the DMS 102 transmits an auxiliary authorisation request to the second user device. For instance, the DMS 102 may cause a Short Message Service (SMS) to be transmitted to the mobile telephone number of the second user comprising the authorisation request. The SMS includes a prompt for the second user to authorise the data request.

In step 8, the second user accesses the online account that is shared by the first user and the second user. This can occur by the second user inputting their login information into a web-page or an application via an account interface using the second user device 106. Once the second user has provided the login information, the second user is authenticated by the DMS 102. The second user is then presented with a main authorisation request which comprises a prompt for the second user to authorise the first user's consent for the data to be shared with the remote system. The second user provides their consent for the remote system 108 to access the data in response to the prompt via the online account. Then, the DMS 102 updates the state of the account request resource to indicate that the account request has been authorised by the first user and the second user. This may involve setting a flag associated with the second user to indicate that the data is authorised to be shared with the remote system 108, where previously the flag was set to indicate that the data is not authorised to be shared with the remote system 108.

Once the DMS 102 has been updated to indicate that request has been authorised by the second user (and any other users that can jointly access the data), a notification is transmitted to the first user. This notification comprises a message indicting that the second user (and any other user) has provided authorisation for the data to be shared with the remote system 108. The notification may be sent via SMS, email or pre-recorded voice message via telephone.

In step 9, the first user from which the initial request for access to data was initiated reconnects with the remote system 108.

In step 10, the remote system 108 transmits a request for access to the secure data item that is jointly accessible by the first user and the second user. This is carried out by making a GET request, which is supported by the Hypertext Transfer Protocol, to the relevant resource at the DMS 102.

In step 11, since both the first and the second users have provided their consent, the secure data item that is jointly accessible by the first and second users is transmitted from the DMS 102 to the remote system 108.

Figure 3:
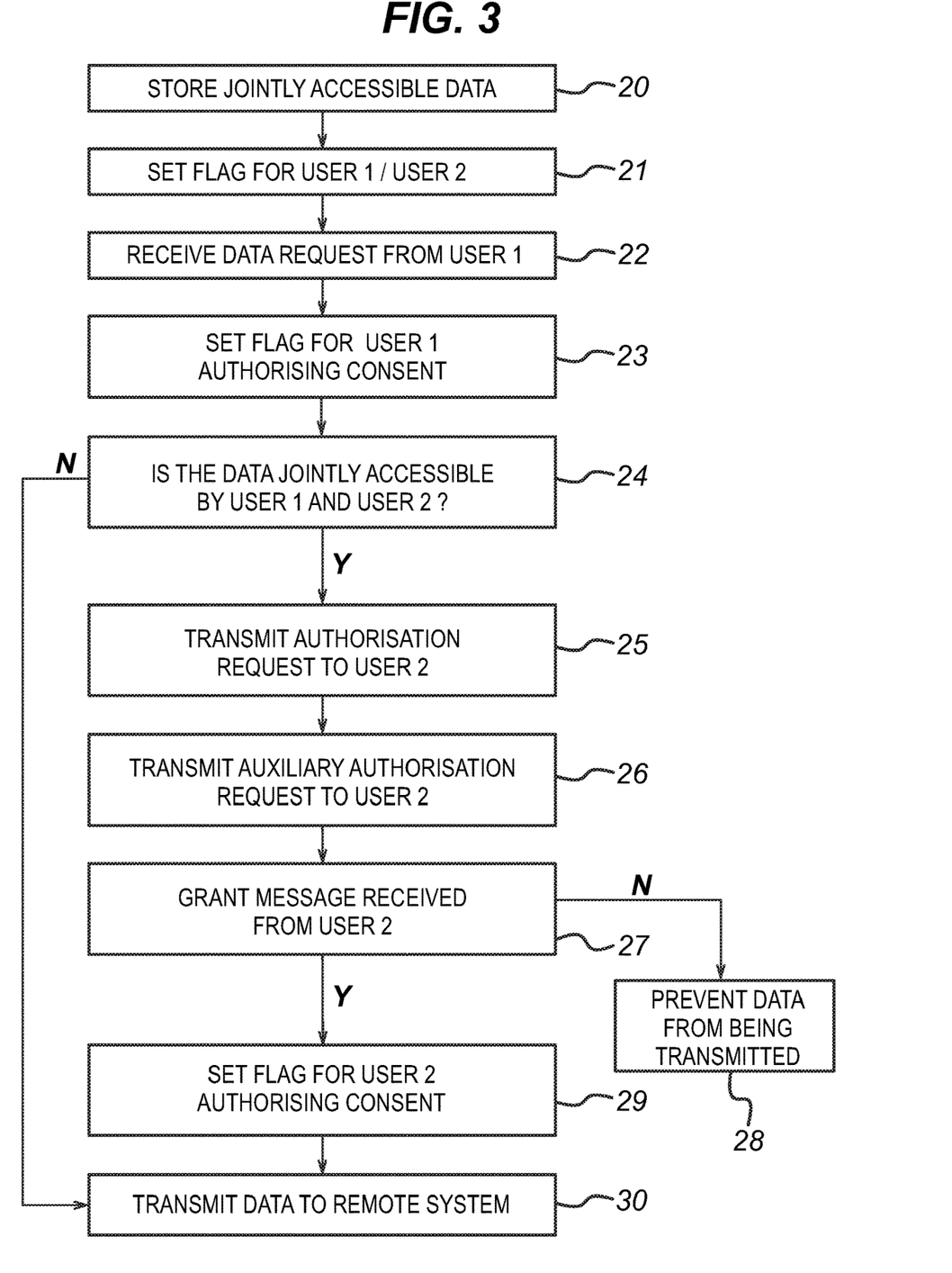
FIG. 3 illustrates a flow chart of a computer-implemented method performed by the system for managing secure data.

FIG. 3 shows a flow chart illustrating, at an overview level, a method of sharing the jointly accessible data stored at the DMS 102 with the remote system 108.

In step 20, at least one secure data item is stored at a data storage resource at the DMS 102. In this example, the at least one secure data item is indicative of the details of a financial transaction. However, in other examples the at least one secure data item may relate to any type of secure data for which access by unauthorised third parties is to be restricted.

In step 21, if the secure data item is jointly accessible by the first user and the second user, the DMS 102 sets a first flag associated with the first user and a second flag associated with the second user. In this step, the first flag indicates that the secure data item is not to be shared with a remote system, and the second flag indicates that the secure data items is not to be shared with a remote system. If the data item is not jointly accessible, and is accessible by the first user only without first being authorised to be accessed by third parties, the DMS 102 sets the first flag only.

In step 22, the DMS 102 receives a data request from the first user device 104. The data request comprises an instruction to transmit the secure data item to the remote system 108. Step 22 of FIG. 3 may be executed in a similar manner to steps 1 and 2 as described with reference to FIG. 2, where the first user sends a request for the secure data item to be shared via the remote system. Step 22 of FIG. 3 may be executed in a similar manner to step 4 as described with reference to FIG. 2, where the first user device 104 is redirected to the DMS 102 with the account request identifier. Step 22 of FIG. 3 may be executed in a similar manner to step 5 as described with reference to FIG. 2, where the first user device 104 authorises the DMS 102 to transmit the data to the remote system 108. Step 22 of FIG. 3 may be executed as steps 1 to 5 in combination as described with reference to FIG. 2.

In step 23, the first user provides authorisation to the DMS 102 for the secure data item to be sent to the remote system 108, as described with reference to step 5 in FIG. 2. Once the first user has provided their authorisation, the first flag associated with the first user is set to indicate that the secure data item is to be shared with the remote system 108.

In step 24, the DMS 102 determines whether the secure data item is jointly accessible by a plurality of users. Step 24 may be executed in a similar manner to step 6 of FIG. 2. In step 24, the DMS 102 may determine that the secure data items is jointly accessible by the first user and the second user. This may occur, for instance, by identifying that a first identification number associated with the first user and a second identification number associated with the second user are both associated with the secure data item.

If the DMS 102 determines that the secure data item is not jointly accessible, the method proceeds to step 30 in which the secure data item is transmitted to the remote system 108. Step 30 may be executed in a similar manner to steps 10 and 11 of FIG. 2.

In step 24, the DMS 102 may determine that the secure data item is jointly accessible by the first user and the second user. In this scenario the method proceeds to step 25 in which the DMS 102 seeks authorisation from the second user for the secure data item to be shared.

In step 25, the DMS 102 transmits an authorisation message to the second user via the account interface of the shared online data storage account of the first user and the second user, as in step 7 of FIG. 2. The authorisation message comprises a prompt for the second user to authorise the data request previously authorised by the first user. Thus, when the second user accesses the account interface by entering their login information into a web-page or application used for accessing the shared online data storage account, the second is presented with or can navigate to the authorisation message. In this example, the second user may access the online account using the second user device or any other suitable device.

The authorisation message is not made available to the first user via the account interface, so that the first user is unable to provide authorisation on behalf of the second user. The DMS 102 recognises whether the first user or the second user is accessing the online account from the unique login information provided by either user. The authorisation message is not presented if the DMS 102 determines that the first user is accessing the online account. However, the authorisation message is presented if the DMS 102 determines that the second user is accessing the online account.

In step 26, which may occur at the same time, before, or after step 25, the DMS 102 transmits an auxiliary authorisation request to the second user. The auxiliary authorisation request provides a prompt for the second user to authorise the data request previously authorised by the first user. This prompt may comprise an instruction for the second user to access the online account in order to be presented with the authorisation request sent in step 25.

The prompt provided by the auxiliary authorisation request may comprise a link to the web-page or application through which the account interface can be accessed. This may increase the ease and speed at which the second user is able to connect with the online account. However, providing a link in the auxiliary authorisation request may increase the likelihood of so-called "phishing" attacks. In order to avoid to avoid the risk of such attacks, the prompt may not comprise a link, and may only provide written or aural instructions for the user to login to their online account.

In step 26, the DMS 102 may transmit a Short Message Service (SMS) comprising the auxiliary authorisation request to a telephone number associated with the second user. Thus, the auxiliary authorisation request is received at a telephone of the second user, which may be the second user device 104 or any other suitable device. The DMS 102 may transmit an email comprising the auxiliary authorisation request to an email address associated with the second user. Thus, the auxiliary authorisation request is received via an email service operated at a device of the second user, which may be second user device 104 or any other suitable device. The DMS 102 may transmit a pre-recorded voice message comprising the auxiliary authorisation request to a telephone number associated with the second user. Thus, the auxiliary authorisation request is received at a telephone of the second user, which may be the second user device 104 or any other suitable device.

In step 27, the user chooses to authorise or reject the data request via the account interface. If the data request is authorised, a grant message is sent from the device operated by the second user to the DMS 102, as in step 8 of FIG. 2. If the data request is rejected, the grant message is not sent and a rejection message may be sent instead. If the data request is rejected by the second user, the method proceeds to step 28 in which the secure data item is prevented from being sent to the remote system 108. In this situation the second flag associated with the second user is maintained to indicate that the secure data item is not to be transmitted to the remote system 108.

If the data request is authorised and the grant message is sent, the method proceeds to step 29. In this step, the second flag associated with the second user is set to indicate that the secure data item is authorised to be shared with the remote system.

In step 30, the DMS 102 identifies that both the first flag and the second flag are set to indicate that the first and second users have provided authorisation for the secure data item to be shared with the remote system 108. In this situation, the DMS 102 transmits the secure data item to the remote system 108, as in step 11 of FIG. 2.

In another example, there is a method that can enable a user to indicate to the DMS 102 that none of their secure data is to be shared with any third parties or remote systems. In this method, at least one data item is stored at the DMS 102. The at least one data item, in this instance, is a secure data item that is accessible by the user via an account interface of an online data storage account associated with the first user. The secure data item may be a data item that is accessible by the first user only without prior consent for the data item to be accessed by a third party. Alternatively, the secure data is jointly accessible by at least two users as explained above.

The first user may operate the account interface of the data storage account to transmit a data retention request to the DMS 102. The data retention request is indicative that the first user does not authorise the secure data item to be transmitted to a remote system 108 or any other such third party. The data retention request is received at the DMS 102, from the first user device 104.

In response to receiving the data retention request, the DMS 102 sets a data retention flag in association with the first user. The data retention flag indicates that the secure data of the first user is not to be shared outside of the DMS 102. The data retention flag overrides the first or the second flag described above, which can be used to indicate that the first or the second user has provided consent for the data to be shared. Therefore, the DMS 102 cannot transmit the secure data to the remote system 108 while the data retention flag is set to indicate that the data is not to be shared, even if the first or the second flag indicates that the user has provided consent.

Once the data retention flag has been set, the DMS 102 may receive a data request from a system that is remote and distinct from the DMS 102 which requests access to the secure data item. In response to the data request, the DMS 102 identifies that the first user is associated with the data retention flag and thus prevents transmission of the secure data item to the remote system 108. The DMS 102 is only able to transmit the secure data item to the remote system 108 if the data retention flag is set to indicate that the data is authorised to be shared.

Figure 4:
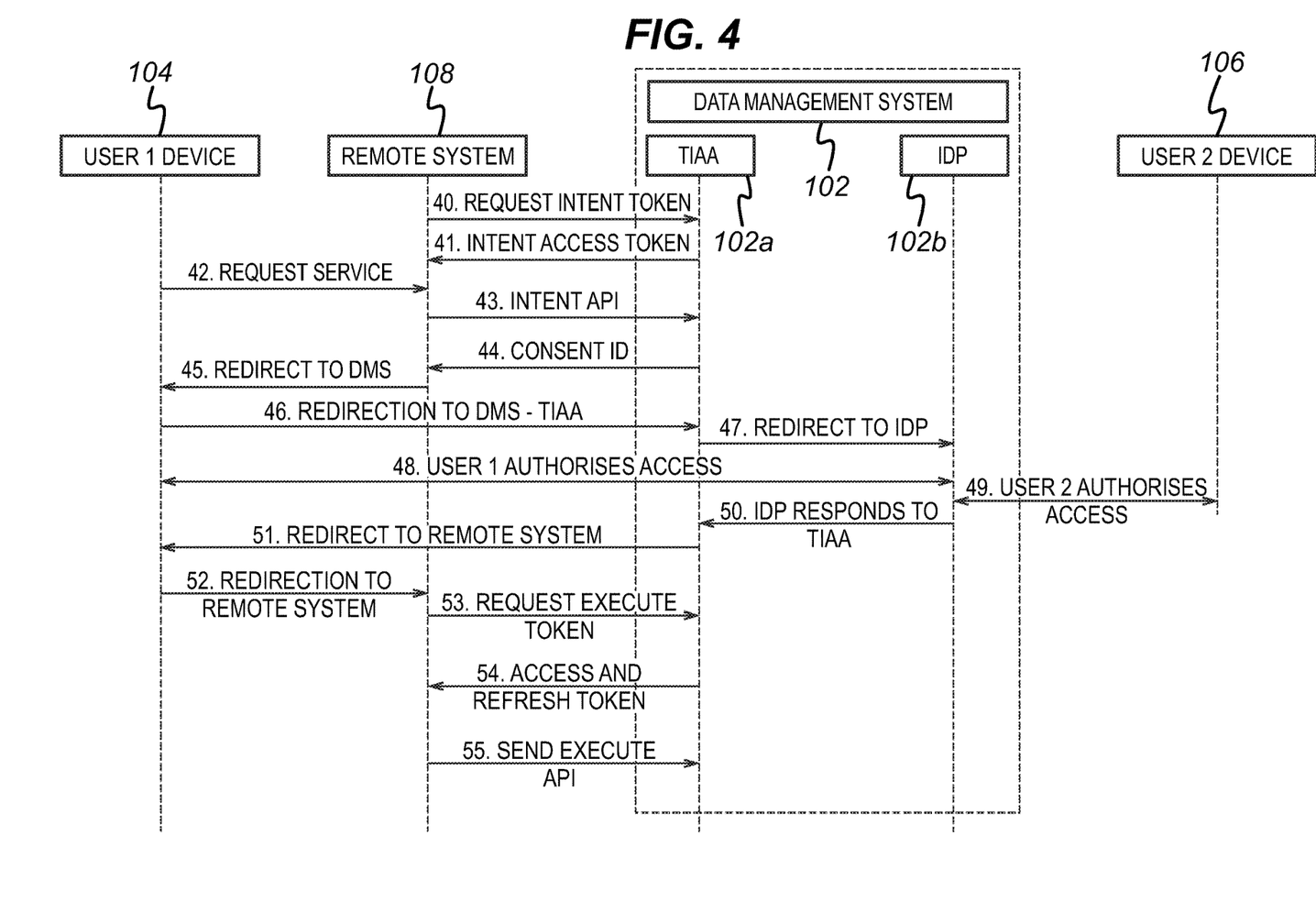
FIG. 4 illustrates a protocol sequence diagram of the computer-implemented method for managing access to the secure data.

FIG. 4 shows a protocol sequence diagram which illustrates the method described with reference to FIG. 2 in greater detail. Referring the FIG. 4, the DMS 102 described above further comprises a trusted identity and attribute authority 102a (TIAA) and an identity provider 102b (IDP).

In steps 40 and 41, the remote system 108 and the DMS 102 interact in order for an intent token to be transmitted to the remote system 108. Specifically, in step 40 the remote system 108 transmits a request for an access token to the TIAA 102a at the DMS 102. The access token being requested is a web token that is configured to enable the remote system 108 to send an intent application programming interface (API) to the DMS 102.

The access token requested by the remote system 108 will be valid for a predetermined period of time. Thus, the access token can be used more than once by the remote system 108. In this example, the web token is a JavaScript Object Notation (JSON) web token.

In step 40, the request for the access token is transmitted directly to the TIAA 102a, and the request comprises a client identifier and a client secret. The client identifier and the client secret are previously assigned to the remote system 108, when the remote system 108 registers with the DMS

102. The TIAA 102*a* validates the client identifier and the client secret in order to authenticate the remote system 108.

In step 41, the TIAA 102*a* generates an intent access token and transmits the intent access token to the remote system 108.

In step 42, the first user transmits a message to the remote system 108 indicating that the first user has requested for the DMS 102 is to transmit a secure data item to the remote system 108. In this example, the secure data is a data item that is jointly accessible by the first user and the second via an account interface of a shared online data storage account.

In step 43, the remote system 108 transmits an external consent intent API, along with the intent access token provided previously in step 41. The remote system 108 also sends the details of the user's consent request, such as the account type, period of time, permissions, as described with reference to the account request setup payload in step 2 of FIG. 2.

In step 43, the TIAA 102*a* receives the external consent intent API and validates the corresponding intent access token. In addition, the identity of the remote system 108 is authenticated in order to determine whether the remote system 108 is an authorised entity. If the remote system is not an authorised entity or the intent access token is not valid, the external consent intent API will be rejected, and an error code is returned to the remote system 108.

Further in step 43, the DMS 102 uses an internal consent intent API, which generates a unique consent identifier that corresponds with the request received from the remote system 108 and remains valid throughout the lifecycle of the request. The internal consent API stores the details of the intent in a consent database in association with the consent identifier. Then in step 44 the DMS 102 returns the unique consent identifier to the remote system 108.

In step 45, once the remote system 108 has received the consent identifier from the consent intent API, the remote system 108 retrieves a redirect URL from a registry which points to the TIAA 102*a*. In this step, the remote system 108 redirects first user device 104 to the TIAA 102*a* with the client identifier, the unique consent identifier and the details of the user's consent request. This information is sent using OAuth 2.0.

In step 46, the first user device 104 is redirected to the TIAA 102*a*, which validates the client identifier and the details of the user's consent request.

In step 47, the TIAA 102*a* transmits a redirect uniform resource identifier (URI) to the first user device 104 and a first reference code. This redirects the first user device 104 to the IDP 102*b*. In turn, the IDP 102*b* transmits a request to the TIAA 102*a* for the consent identifier and the details of the user's consent request. Then, it is necessary for the IDP 102*b* to obtain a linking identifier. The IDP 102*b* will then call an API for obtaining the linking identifier. In addition, a call to the TIAA 102*b* is required to translate the client identifier and the remote system 108 identifier into textual names.

In step 48, the first user is prompted to authenticate their identity. For instance, the first user is prompted to input their unique login information via a user interface. The first user then operates the user interface of the online account to navigate to a consent page or area. At that point, an internal authorisation API for obtaining the first user's consent is configured to match the request with the data previously received via the consent intent API to obtain the full consent that the customer is being asked to authorise. This is achieved via the linking identifier or via a direct deep link approach (for mobile devices only) using the consent identifier directly.

In step 48, the IDP 102*b* constructs a list of accounts that the first user can select. This will be constructed by generating a list of all accounts to which the first user has access to the data of, or the accounts from which the user can make a payment, or the accounts that are enabled for data sharing. For instance, certain account types may be enabled or disabled for sharing data. The enabled account types will appear in the list, while the disabled account types will not appear in the list.

In step 48, the first user is presented with the consent that they have requested and the list of accounts for the first user to choose from. Next, the customer authorises the consent, and since the user has been authenticated, an identifier for the first user will be known. The authorisation received from the user will be digitally signed within the IDP 102*b* and will be stored in associated with the authorised consent.

In this step 49, the DMS 102 determines whether the data to which the remote system 108 has been granted access by the first user is jointly accessible by another user. In this example, the DMS 102 determines that the data is jointly accessible by the second user. In this scenario, the DMS 102 interacts with the second user via the second user device 106 or another suitable device in order to obtain consent from the second user. This process may occur in a similar manner to that described above, but the DMS 102 interacts with the second user rather than the first user.

In step 50, the first user device is redirected back to the TIAA 102*a*.

In step 51, the TIAA 102*a* sends an authorisation code and a URI to the first user device. The URI is assigned to the remote system 108 when the remote system 108 registers with the DMS 102 initially and is used to redirect the first user device to the remote system 108.

In step 52, the first user device 10 is redirected to the remote system 108.

In step 53, the authorisation code is sent by the remote system 108 to the TIAA 102*a* which validates the authorisation code and the identity of the remote system 108.

In step 54, the TIAA 102*a* transmits an access token and a refresh token to the remote system 108. On subsequent requests, the remote system 108 will transmit the refresh token rather than the authorisation code. After validation, the TIAA 102*a* will issue a new access token and a new refresh token.

In step 55, the remote system 108 transmits an external execute API to the DMS 102, which matches the details held in the authorised consent.

The consent identifier is passed to an internal execute API at the DMS 102, which will call an internal validate authorised consent API using the consent identifier along with any additional data required from the execute API to match against the Authorised Consent (such as the account number, and payment details).

The validate authorised consent API will then check that the consent identifier exists and has not expired. The validate authorised consent API will also check that any details passed match the authorised consent. This may include checking that the API being executed within scope of the user's authorisation that have been authorised, that the account being requested within the accounts have been authorised.

In this step, the secure data item that is jointly accessible by the first user and the second user is transmitted to the remote system 108. This is enabled because both the first user and the second user have provided their consent for the data to be shared with the remote system 108.

The validate Authorised consent API will pass back a success or failure message to the calling execute API. For a success message, the API will also pass back the translation from the consent customer identifier to the actual customer identifier as used by the IDP 102b, the consent account identifier to the actual account identifier, and any other data that was saved at the point of authorisation (e.g. a biometrics score for detecting fraud).

Figure 5:
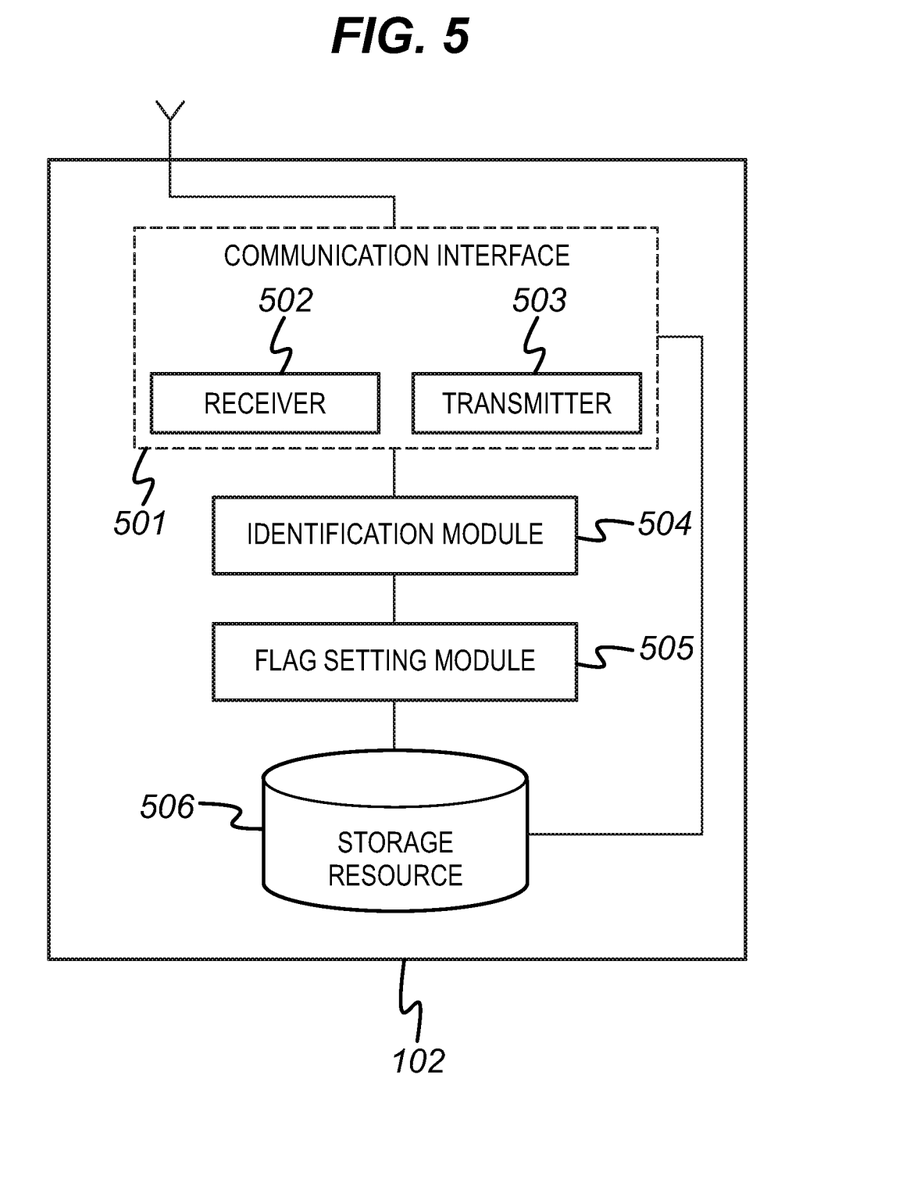
FIG. 5 illustrates a schematic diagram of a data management system.

Referring to FIG. 5, the DMS 102 comprises a communication interface 501 comprising a receiver 502 and a transmitter 503. The DMS 102 also comprises an identification module 504, a flag setting module 505 and a storage resource 506.

The receiver 502 and the transmitter 503 are configured to receive and transmit the messages to and from the DMS 102 as explained above. The identification module 504 is arranged to identify whether a secure data item is a jointly accessible data item. The flag setting module 505 is arranged to manage the setting of flags as described above. The storage resource is arranged to store the secure data items at the DMS 102.

Figure 6:
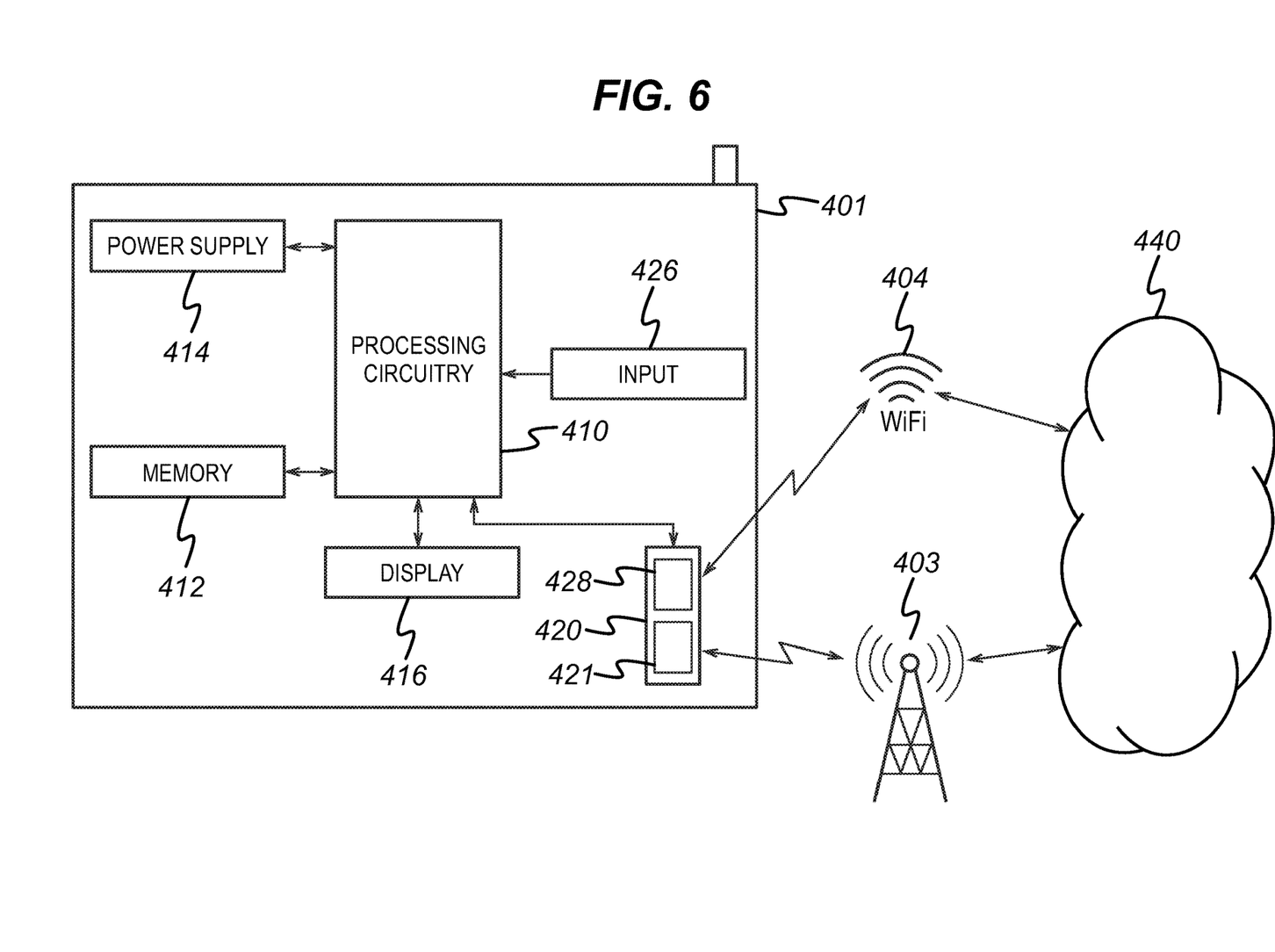
FIG. 6 illustrates a schematic diagram of an example device in the system.

FIG. 6 shows an exemplary electronic device 401 according to any of the electronic devices or systems of this disclosure (such as the first user device 102, the second user device 104, the remote system 108, the DMS 102, the TIAA 102a or the IDP 102b). The electronic device 401 comprises processing circuitry 410 (such as a microprocessor) and a memory 412. Electronic device 401 may also comprise one or more of the following subsystems: a power supply 414, a display 416, a transceiver 420, and an input 426.

Processing circuitry 410 may control the operation of the electronic device 401 and the connected subsystems to which the processing circuitry is communicatively coupled. Memory 412 may comprise one or more of random access memory (RAM), read only memory (ROM), non-volatile random access memory (NVRAM), flash memory, other volatile memory, and other non-volatile memory.

Display 416 may be communicatively coupled with the processing circuitry 410, which may be configured to cause the display 416 to output images representative of the secure data shared between the entities in the system 100.

The display 416 may comprise a touch sensitive interface, such as a touch screen display. The display 416 may be used to interact with software that runs on the processor 410 of the electronic device 401. The touch sensitive interface permits a user to provide input to the processing circuitry 410 via a discreet touch, touches, or one or more gestures for controlling the operation of the processing circuitry and the functions described herein. It will be appreciated that other forms of input interface may additionally or alternatively be employed for the same purpose, such as the input 426 which may comprise a keyboard or a mouse at the input device.

The transceiver 420 may be one or more long-range RF transceivers that are configured to operate according to communication standard such as LTE, UMTS, 3G, EDGE, GPRS, GSM, and Wi-Fi. For example, electronic device 401 may comprise a first wireless transceiver 421, such as a cellular transceiver, that is configured to communicate with a cell tower 403 via to a cellular data protocol such as LTE, UMTS, 3G, EDGE, GPRS, or GSM, and a second transceiver 428, such as a Wi-Fi transceiver, that is configured to communicate with a wireless access point 404 via to a Wi-Fi standard such as 802.11 ac/n/g/b/a. In this regard and for the purposes of all embodiments herein concerning a long-range wireless protocol, a long-range wireless protocol may be a protocol which is capable and designed for communication over 5, 10, 20, 30, 40, 50, or 100 m. This is in contrast to short-range wireless protocol mentioned above. The long-range wireless protocol may communicate utilizing higher power than the short-range wireless protocol. The range (e.g. line of sight distance) between the long-range end nodes (electronic device and router or base station) for the long-range wireless protocol may be greater than the range (e.g. line of sight distance) between the short-range end nodes (e.g. electronic device and wireless beacon).

Electronic device 401 may be configured to communicate via the transceiver 420 with a network 440. Network 440 may be a wide area network, such as the Internet, or a local area network. Electronic device 401 may be further configured to communicate via the transceiver 420 and network 440 with one or more systems 14 or user devices 11, 12, 13. These servers or user devices may be any one of those described herein.

The term "comprising" encompasses "including" as well as "consisting" e.g. a composition "comprising" X may consist exclusively of X or may include something additional e.g. X+Y.

The word "substantially" does not exclude "completely" e.g. a composition which is "substantially free" from Y may be completely free from Y. Where necessary, the word "substantially" may be omitted from the definition of the invention.

The term "about" in relation to a numerical value x is optional and means, for example, x±10%.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

LIST OF NUMBERED EMBODIMENTS

1. A computer-implemented method for managing data associated with a first user having a first user device and a second user having a second user device, the method comprising:
    storing, at a first system, a secure data item jointly accessible by the first user and the second user;
    receiving, at the first system from the first user device, a data request comprising an instruction to transmit the secure data item to a second system;
    identifying, at the first system, that the secure data item is jointly accessible by the first user and the second user;
    in response to identifying that the secure data item is jointly accessible by the first user and the second user, transmitting an authorisation request to the second user device, wherein the authorisation request comprises a prompt for the second user to authorise the data request;
    receiving, from the second user device, a grant message indicative of the second user granting the authorisation request;
    in response to receiving the grant message, transmitting the secure data item to the second system; and
    preventing the secure data item from being sent to the second system, if the grant message is not received.
2. The computer-implemented method of embodiment 1, wherein the first user and the second user each have joint access to a shared online data storage account via an account interface, and the secure data item pertains to data of the shared online data storage account.
3. The computer-implemented method of embodiment 2, wherein the authorisation request is transmitted to the second user device via the account interface.
4. The computer-implemented method of embodiment 3, wherein the second user accesses the authorisation request via the account interface by inputting a security key into a browser or application at the second user device.
5. The computer-implemented method of embodiment 4, wherein the security key comprises at least one of password data or biometric data.
6. The computer-implemented method of embodiment 4 or embodiment 5, further comprising:
    in response to identifying that the secure data item is jointly accessible by the first user and the second user, transmitting an auxiliary authorisation request comprising an auxiliary prompt for the second user to authorise the data request;
    wherein the second user accesses the auxiliary authorisation request via an alternative means that is different to the shared online data storage account; and
    wherein the auxiliary authorisation request comprises a prompt for the second user to access the shared online data storage account to provide authorisation of the data request.
7. The computer-implemented method of embodiment 6, wherein transmitting the auxiliary authorisation request comprises at least one of:
    transmitting a Short Message Service (SMS) comprising the auxiliary authorisation request to a telephone number associated with the second user;
    transmitting an email comprising the auxiliary authorisation request to an email address associated with the second user; and
    transmitting a pre-recorded voice message comprising the auxiliary authorisation request to a telephone number associated with the second user.
8. The computer-implemented method of embodiment 7 wherein the auxiliary authorisation request comprises a prompt for the second user to access the shared online data storage account.
9. The computer-implement method of embodiment 8 wherein the auxiliary authorisation request does not comprise a link to a web-page or an application.
10. The computer-implemented method of any one of embodiments 6 to 9, wherein the auxiliary authorisation request is transmitted to the second user device and/or another user device of the second user.
11. The computer-implemented method of any one of the preceding embodiments, wherein the first user device and/or the second user device is an electronic device, such as a computing device, a laptop, a desktop, a smartphone or a tablet device.
12. The computer-implemented method of any one of the preceding embodiments, wherein storing the secure data item associated with the first user and the second user comprises:
    setting a first flag associated with the first user to indicate that the secure data item is not authorised to be shared with the second system; and
    setting a second flag associated with the second user to indicate that the secure data item is not authorised to be shared with the second system;
    wherein receiving, at the first system from the first user device, the data request comprising the instruction to transmit the secure data item to the second system comprises:

setting the first flag to indicate that the secure data item is authorised to be shared with the second system;

wherein receiving, from the second user device, the grant message indicative of the second user granting the authorisation request comprises:

setting the second flag to indicate that the secure data item is authorised to be shared with the second system;

wherein the secure data item is transmitted to the second system only if both the first flag and the second flag indicate that the secure data item is authorised to be shared with the second system.

13. The computer-implemented method of any one of the preceding embodiments wherein the data request is received at the first system directly from the first user device or the data request is received at the first system indirectly via the second system.

14. The computer-implemented method of any one of the preceding embodiments, wherein the shared user data comprises financial data indicative of previously executed transactions linked with a shared online data storage account belonging to the first user and the second user.

15. The computer-implemented method of any one of the preceding embodiments, the method further comprising:

receiving at the first system, from the first user device, a data retention request comprising an instruction not to transmit the first data item stored at the first system to a system distinct from the first system;

in response to receiving the data retention request, setting a data retention flag at the first system in association with the first user;

receiving a data request from the second system for access to the first data item;

in response to the data request, identifying that the first user is associated with the data retention flag at the first system and preventing transmission of the first data item to the second system.

16. The computer-implemented method of embodiment 12 and 15 further comprising:

identifying that the first flag is set to indicate that the secure data item is authorised to be shared with the second system;

identifying that that the first user is associated with the data retention flag; and preventing transmission of the first data item to the second system.

17. A computer program comprising instructions which, when the program is executed by a computer, cause the computer to carry out the method of any one of the preceding embodiments.

18. A data carrier signal carrying the computer program of embodiment 17.

19. A computer readable medium which, when the program is executed by a computer, cause the computer to carry out the method of any one of embodiments 1 to 16.

20. A data management system comprising:

a data storage resource configured to store a secure data item jointly accessible by both a first user and a second user; and processing circuitry configured to:

receive, from a first user device associated with the first user, a data request comprising an instruction to transmit the secure data item from the data storage resource to a remote system;

identify that the secure data item is jointly accessible by the first user and the second user;

transmit an authorisation request to a second user device associated with the second user, in response to identifying that the secure data item is jointly accessible by the first user and the second user, the authorisation request comprising a prompt for the second user to authorise the data request;

receive, from the second user device, a grant message indicative of the second user granting the authorisation request;

transmit the secure data item to the remote system in response to receiving the grant message; and prevent the secure data item from being sent to the remote system, if the grant message is not received.

21. A data management system comprising:

a data storage resource configured to store a secure data item jointly accessible by both a first user and a second user;

a receiver configured to receive, from a first user device associated with the first user, a data request comprising an instruction to transmit the secure data item from the data storage resource to a remote system;

an identification module arranged to identify that the secure data item is jointly accessible by the first user and the second user;

a transmitter arranged to transmit an authorisation request to a second user device associated with the second user, in response to identifying that the secure data item is jointly accessible by the first user and the second user, the authorisation request comprising a prompt for the second user to authorise the data request;

wherein the receiver is arranged to receive, from the second user device, a grant message indicative of the second user granting the authorisation request;

wherein the transmitter is arranged to transmit the secure data item to the remote system in response to receiving the grant message; and wherein the transmitter is arranged to prevent the secure data item from being sent to the remote system, if the grant message is not received.

22. A computer-implemented method for managing data associated with a first user having a first user device, the method comprising:

storing, at a first system, a first data item accessible by the first user;

receiving at the first system, from the first user device, a data retention request comprising an instruction not to transmit the first data item stored at the first system to a system distinct from the first system;

in response to receiving the data retention request, setting a data retention flag at the first system in association with the first user;

receiving a data request from a system distinct from the first system for access to the first data item;

in response to the data request, identifying that the first user is associated with the data retention flag at the first system and preventing transmission of the first data item to the second system.

23. A computer program comprising instructions which, when the program is executed by a computer, cause the computer to carry out the method of embodiment 22.

24. A data carrier signal carrying the computer program of embodiment 23.

25. A computer readable medium which, when the program is executed by a computer, cause the computer to carry out the method of embodiments 22.

26. A data management system for managing data associated with a first user having a first user device comprising:

a data storage resource configured to store a first data item accessible by the first user; and processing circuitry configured to:

receiving at the data management system, from the first user device, a data retention request comprising an instruction not to transmit the first data item to a system distinct from the data management system;

in response to receiving the data retention request, setting a data retention flag at the data management system in association with the first user;

receiving a data request from a system distinct from the data management system for access to the first data item;

in response to the data request, identifying that the first user is associated with the data retention flag at the data management system and preventing transmission of the first data item to the system distinct from the data management system.

27. A data management system for managing data associated with a first user having a first user device comprising:

a data storage resource configured to store a first data item accessible by the first user;

a receiver arranged to receive, from the first user device, a data retention request comprising an instruction not to transmit the first data item to a system distinct from the data management system;

a flag setting module arranged to set a data retention flag at the data management system in association with the first user, in response to receiving the data retention request;

wherein the receiver is arranged to receive a data request from a system distinct from the data management system for access to the first data item; and a identification module arranged to identify that the first user is associated with the data retention flag and preventing transmission of the first data item to the system distinct from the data management system in response to the data request.

The invention claimed is:

1. A computer-implemented method for managing data associated with a first user having a first user device and a second user having a second user device, the method comprising:

storing, at a first system, a secure data item jointly accessible by the first user and the second user;

sending, via the first user device to a second system, which is remote and distinct from the first system, a message that is indicative of the first user providing their consent for the second system to access the secure data item from the first system;

connecting the second system to the first system via an account request resource;

redirecting the first user device to the first system with an account request identifier so as to correlate the account request resource with the first user device;

authenticating the first user of the first user device at the first system;

once the first user has been authenticated, receiving, at the first system from the first user device, a data request comprising a consent instruction to transmit the secure data item to the second system;

identifying, at the first system, that the secure data item is jointly accessible by the first user and the second user;

in response to identifying that the secure data item is jointly accessible by the first user and the second user, transmitting an authorization request to the second user device, wherein the authorization request comprises a prompt for the second user to authorize the data request;

receiving, from the second user device, a grant message indicative of the second user granting the authorization request;

in response to receiving the grant message, transmitting the secure data item to the second system; and preventing the secure data item from being sent to the second system, if the grant message is not received.

2. The computer-implemented method of claim 1 wherein the first user and the second user each have joint access to a shared online data storage account via an account interface, and the secure data item pertains to data of the shared online data storage account.

3. The computer-implemented method of claim 2 wherein the authorization request is transmitted to the second user device via the account interface.

4. The computer-implemented method of claim 3 wherein the second user accesses the authorization request via the account interface by inputting a security key into a browser or application at the second user device.

5. The computer-implemented method of claim 4 wherein the security key comprises at least one of password data or biometric data.

6. The computer-implemented method of claim 4 further comprising:

in response to identifying that the secure data item is jointly accessible by the first user and the second user, transmitting an auxiliary authorization request comprising an auxiliary prompt for the second user to authorize the data request;

wherein the second user accesses the auxiliary authorization request via an alternative means that is different to the shared online data storage account; and wherein the auxiliary authorization request comprises a prompt for the second user to access the shared online data storage account to provide authorization of the data request.

7. The computer-implemented method of claim 6 wherein transmitting the auxiliary authorization request comprises at least one of:

transmitting a Short Message Service (SMS) comprising the auxiliary authorization request to a telephone number associated with the second user;

transmitting an email comprising the auxiliary authorization request to an email address associated with the second user; and transmitting a pre-recorded voice message comprising the auxiliary authorization request to a telephone number associated with the second user.

8. The computer-implemented method of claim 6 wherein the auxiliary authorization request is transmitted to the second user device and/or another user device of the second user.

9. The computer-implemented method of claim 7 wherein the auxiliary authorization request comprises a prompt for the second user to access the shared online data storage account.

10. The computer-implement method of claim 9 wherein the auxiliary authorization request does not comprise a link to a web-page or an application.

11. The computer-implemented method of claim 1 wherein storing the secure data item associated with the first user and the second user comprises:

setting a first flag associated with the first user to indicate that the secure data item is not authorized to be shared with the second system; and setting a second flag associated with the second user to indicate that the secure data item is not authorized to be shared with the second system;

wherein receiving, at the first system from the first user device, the data request comprising the instruction to transmit the secure data item to the second system comprises:
setting the first flag to indicate that the secure data item is authorized to be shared with the second system;
wherein receiving, from the second user device, the grant message indicative of the second user granting the authorization request comprises:
setting the second flag to indicate that the secure data item is authorized to be shared with the second system;
wherein the secure data item is transmitted to the second system only if both the first flag and the second flag indicate that the secure data item is authorized to be shared with the second system.

12. The computer-implemented method of claim 1 wherein the data request is received at the first system directly from the first user device or the data request is received at the first system indirectly via the second system.

13. The computer-implemented method of claim 11 the method further comprising:
receiving at the first system, from the first user device, a data retention request comprising an instruction not to transmit the secure data item stored at the first system to a system distinct from the first system;
in response to receiving the data retention request, setting a data retention flag at the first system in association with the first user;
receiving a data request from the second system for access to the secure data item;
in response to the data request, identifying that the first user is associated with the data retention flag at the first system and preventing transmission of the secure data item to the second system.

14. The computer-implemented method of claim 13 further comprising:
identifying that the first flag is set to indicate that the secure data item is authorized to be shared with the second system;
identifying that that the first user is associated with the data retention flag; and preventing transmission of the secure data item to the second system.

15. A data management system comprising:
a data storage resource configured to store a secure data item jointly accessible by both a first user and a second user; and
processing circuitry configured to:
send, via the first user device to a remote system, which is remote and distinct from the first system, a message that is indicative of the first user providing their consent for the remote system to access the secure data item from the first system;
connect the remote system to the first system via an account request resource;
redirect the first user device to the first system with an account request identifier so as to correlate the account request resource with the first user device;
authenticate the first user of the first user device at the first system;
once the first user has been authenticated, receive, from a first user device associated with the first user, a data request comprising a consent instruction to transmit the secure data item from the data storage resource to the remote system;
identify that the secure data item is jointly accessible by the first user and the second user;
transmit an authorization request to a second user device associated with the second user, in response to identifying that the secure data item is jointly accessible by the first user and the second user, the authorization request comprising a prompt for the second user to authorize the data request;
receive, from the second user device, a grant message indicative of the second user granting the authorization request;
transmit the secure data item to the remote system in response to receiving the grant message; and
prevent the secure data item from being sent to the remote system, if the grant message is not received.

* * * * *